No. 826,141. PATENTED JULY 17, 1906.
E. CAMERON.
WEIGHING MACHINE.
APPLICATION FILED SEPT. 2, 1905.

3 SHEETS—SHEET 1.

Witnesses:
John Roberts
Albert L. Smith

Inventor
Ewan Cameron
By Dyer & Dyer
Attorneys.

No. 826,141. PATENTED JULY 17, 1906.
E. CAMERON.
WEIGHING MACHINE.
APPLICATION FILED SEPT. 2, 1905.
3 SHEETS—SHEET 2.
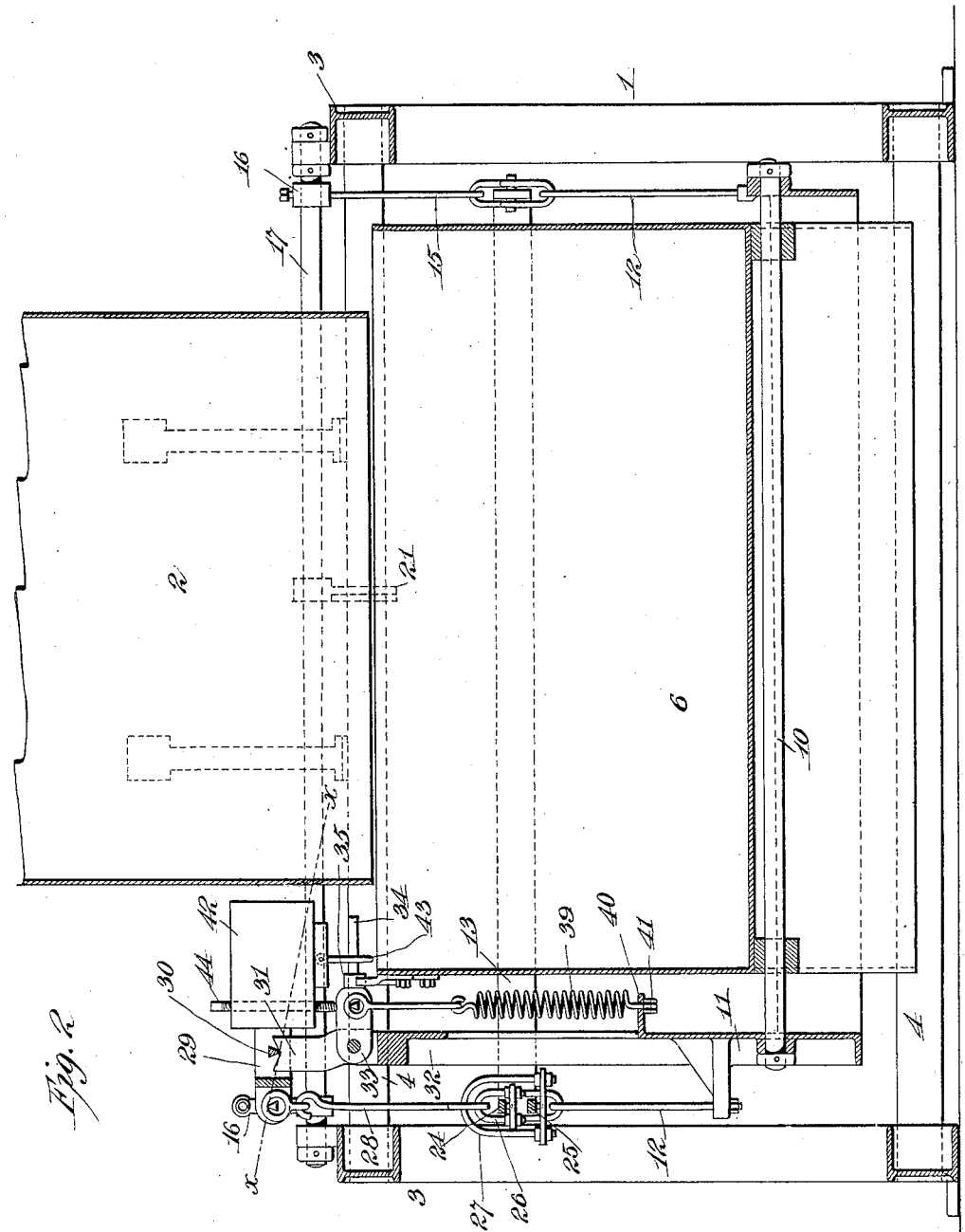

No. 826,141.
PATENTED JULY 17, 1906.
E. CAMERON.
WEIGHING MACHINE.
APPLICATION FILED SEPT. 2, 1905.
3 SHEETS—SHEET 3.
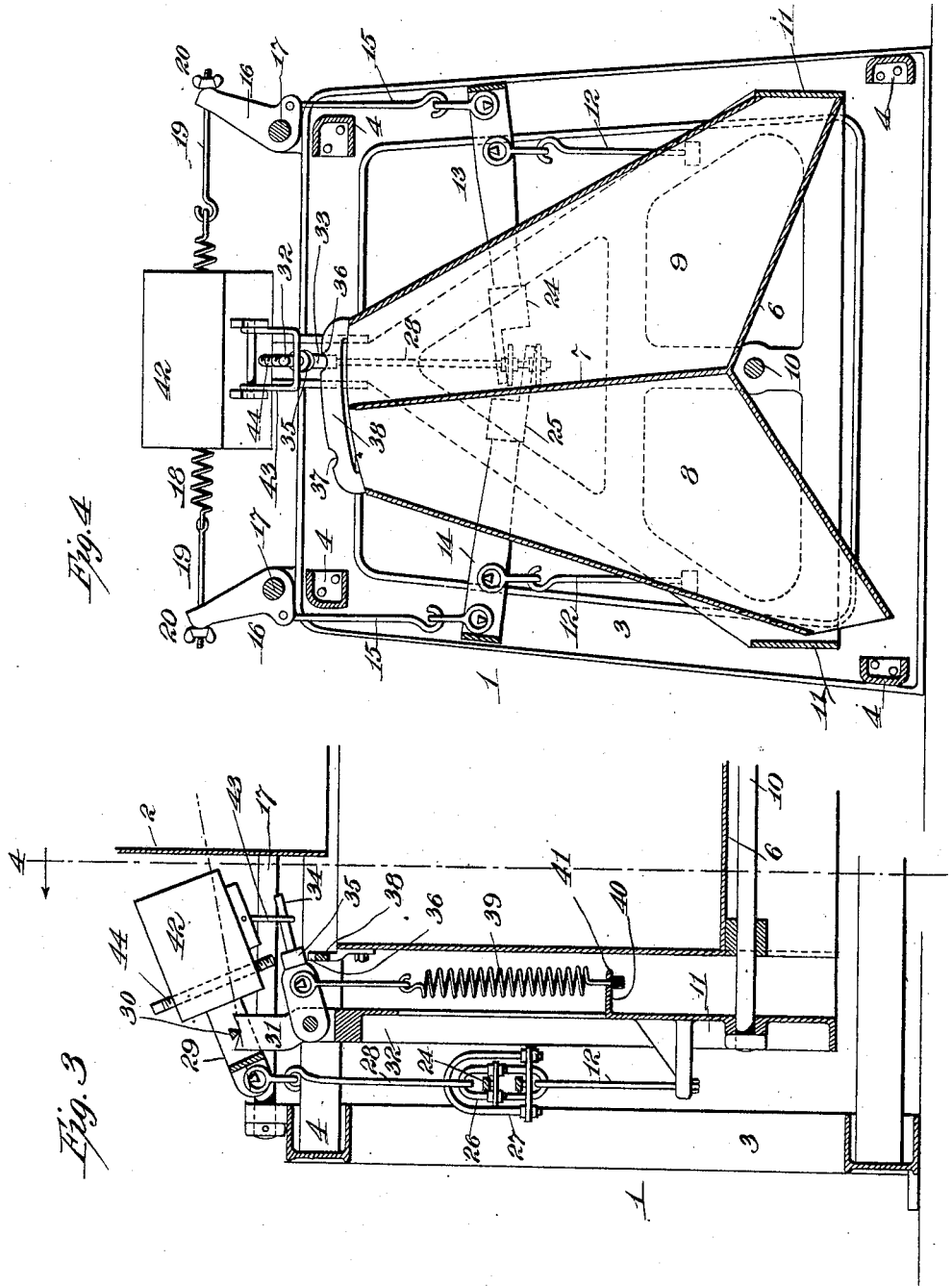
Witnesses:
Inventor
Attorneys.

UNITED STATES PATENT OFFICE.

EWAN CAMERON, OF NEW YORK, N. Y., ASSIGNOR TO UNITED STATES RECORDING AUTOMATIC SCALES COMPANY, OF NEW YORK, N. Y., A CORPORATION OF NEW YORK.

WEIGHING-MACHINE.

No. 826,141.  Specification of Letters Patent.  Patented July 17, 1906.

Application filed September 2, 1905. Serial No. 276,843.

*To all whom it may concern:*

Be it known that I, EWAN CAMERON, a citizen of the United States, residing in the borough of Brooklyn, county of Kings, city and State of New York, have invented a certain new and useful Improvement in Weighing-Machines, of which the following is a description.

This invention relates to an improvement in devices for weighing material in bulk, having a receptacle which is adapted to be intermittently filled with material and after a predetermined weight is admitted will be emptied, the number of times it is emptied and filled being indicated upon a register.

An application for patent filed by me October 26, 1904, Serial No. 230,003, discloses a form of weighing-machine having a receptacle which is mounted upon a pivot and is provided with two chambers which are arranged to be alternately filled by a stream of material passing from a chute or hopper. The receptacle is carried upon a frame which is counterbalanced by a spring, the spring being connected to a latch, which prevents tilting of the receptacle until the spring is sufficiently expanded to release the latch. Such a form of device I find is sufficiently accurate for continuous weighing, but will not do for weighing in detail, such as flour in bags, wherein it is necessary that all bags be of exactly the same weight. This form of scale may have a slight error either way every time a receptacle is filled, the aggregate amount, however, for a large number of weighings being accurate.

The object of the present invention is to produce a device for weighing in detail which will be strictly accurate for each package filled.

A further object is to simplify the construction of the frame and also to improve other details of construction, as will more fully appear.

I attain these objects by means of the mechanism illustrated in the accompanying drawings, in which—

Figure 1:
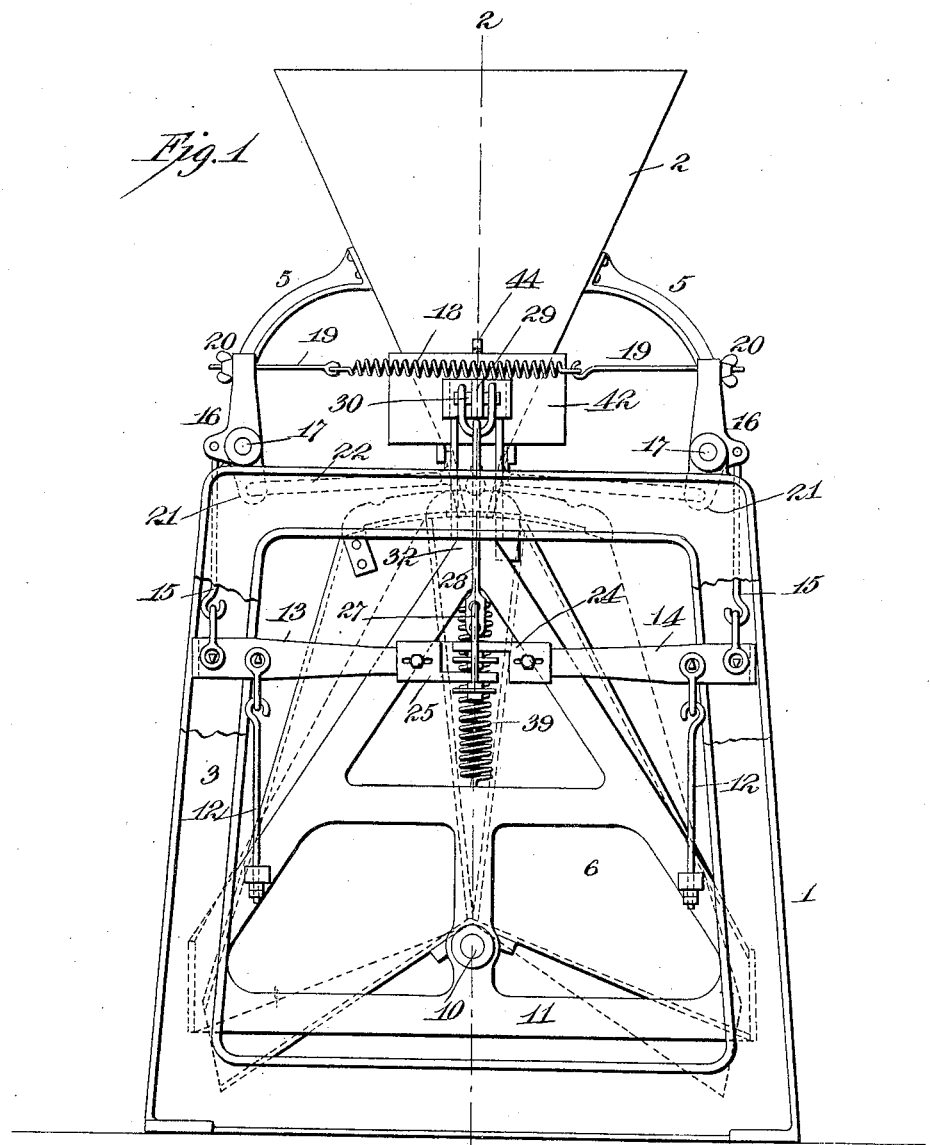
Figure 5:
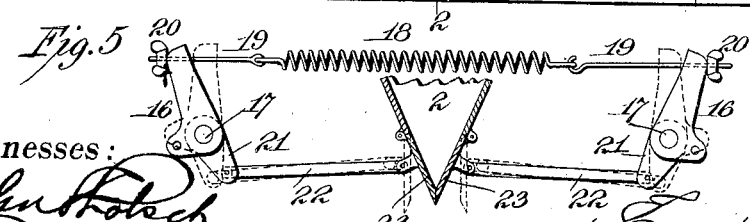

Figure 1 is a front view of a complete device embodying the invention, parts being broken away to more clearly show the construction. Fig. 2 is a longitudinal section thereof, taken on the lines 2 2 thereof. Fig. 3 is a detail view of a portion of the mechanism similar to that shown in Fig. 2, but in a different position. Fig. 4 is a transverse section thereof, taken on the lines 4 4 of Fig. 3. Fig. 5 is a detail view of the gate-operating mechanism.

In all the views like parts are designated by the same reference characters.

In carrying out my invention I provide a frame 1, which carries a hopper or chute 2 at the top thereof. The frame comprises end pieces 3 3 of box-section, as shown in Fig. 2. These are connected together by lateral members 4 4. To the upper lateral members is secured the hopper 2 by means of brackets 5. The receptacle 6 is formed with a dividing-partition 7, so as to form two chambers 8 and 9. These chambers have discharge and inlet openings, as shown. The receptacle is mounted upon a shaft 10, which is carried by a subframe 11, the subframe being so arranged as to alternately mask the discharge-openings of the receptacle and permit one chamber to empty while the other is being filled. The subframe 11 is supported by links 12, connected by knife-edge bearings to pieces of metal 13 and 14, which are bent around inside of the frame 1, forming arms, and are hung from links 15 15 at each end, the links being connected to the arms at each end.

At one end of the frame the arms are extended, as shown in Fig. 1, carrying fittings 24 and 25. These extended arms do not appear at the back of the machine. The links 15 depend from angle-levers 16, connected to horizontal shafts 17. These shafts 17 are mounted upon bearings which are supported upon the end pieces 3 of the frame 1. The angle-levers 16 16 upon opposite sides of the frame are connected together by a spring 18, as shown in Fig. 1. Each extremity of the spring may be connected to one of the levers by means of a rod 19, which is threaded and passes through an opening in the lever and is provided with a thumb-screw 20 for adjustment. A depending lever 21 (shown in Fig. 5) is carried upon each of the shafts 17 and is connected, by means of a link 22, to a gate 23 for regulating the discharge of the hopper 2.

The inner extremities of the arms 13 and 14 constitute levers and are provided with fittings 24 and 25, each having a finger, the finger of the fitting 24 being situated above that of the fitting 25. The finger carried by the fitting 24 enters and engages with a stirrup 26, while the finger carried by the fitting 25 enters and engages with a larger stirrup 27. Both stirrups are carried by a link 28, which is connected to a lever 29 by means of a knife-bearing. This lever is supported by a knife-edge 30, engaging with a bearing 31, carried by an extension 32 from the subframe 11.

A lever 33 is pivoted upon the extension 32 below the lever 29 and has an extension 34. Upon this extension 34 is mounted a roller 35. This roller 35 is arranged to engage within either of the two notches 36 or 37, carried by a sector 38, mounted upon the receptacle. This roller and lever 33 constitute a lock or latch, and the position of the notches is such that when the roller is engaged with one of the notches the entrance to one of the chambers in the receptacle will be below the point of discharge of the hopper, and the exit of the other chamber will be unmasked by the subframe 11. A spring 39 connects, preferably through a knife-bearing, with the lever 33, while the other extremity of the spring is connected to a bracket 40, carried by the subframe 11. An adjusting-nut and lock-nut 41 permit adjustment of the tension of the spring 39. This spring is for the purpose of insuring the descent and retention in place of the latch and lever.

The lever 29 is what scale-makers term the "deciding-lever" and is analogous to that lever in a scale that carries the marks and upon which the adjusting-weight slides. This lever carries a weight, such as the weight 42, and also a link 43. This link surrounds the extension 34 of the lever 33. An adjusting-bolt 44 may be employed, so arranged as to engage with the lever 33 when the lever 29 is horizontal. It will be noted that a line drawn through the bearing 30 of the lever 29 and the bearing connected to the link 28 is inclined, and the mass of the weight is above this line. (See Fig. 2, wherein $x\ x$ is this line.) This produces what scale-makers term a "cocked" lever—that is to say, one which is never in stable equilibrium. When the lever is tilted, this line will incline the other way. (See Fig. 3.) Means may be provided as desired for varying the amount of or the position of the weight 42, so as to adjust the device for measuring different weights. There is some lost motion between the link 43 and the extension 34 of the lever 33.

The operation is as follows: The spring 39 is adjusted so that a weight of several pounds more than the amount to be weighed will be necessary to distend it sufficiently to release the latch from one of the notches 36 and 37. The weight 42 is so adjusted as to its position and amount that it will be raised when the exactly desired amount has been deposited in the receptacle. The material to be weighed is introduced in the hopper and passes in an unbroken stream into that chamber of the receptacle which is immediately below it. The tension of the spring 18 is sufficient to hold the gates 23 wide open as the chamber begins to fill. The increased weight of the receptacle will cause a bodily descent of the subframe 11, links 12, arms 13 and 14, and links 15, and a movement of the levers 16 upon their axes will result, distending the spring 18 and gradually closing the gates 23. When the latch is about to be sprung, the gates will be almost closed, the stream of material at this time entering the receptacle being very small and the amount in the air between the gates and the receptacle very little. This is in accordance with the principle disclosed in my copending application previously referred to. By connecting the two gates 23 to a single spring 18 a much simpler construction is secured than that disclosed in my copending application for patent. Furthermore, the gates will move to an equal extent. Therefore the stream of descending material will always be in the center line above the inlet to the receptacle. The filling of the chamber of the receptacle will also tend to depress the arms 13 and 14, tilting them upon their axes in connection with the links 15, which form a fulcrum. In Fig. 1 the receptacle is in the position that it will assume when empty and in Fig. 4 is in the position it will assume when partially filled, the arms 13 and 14 being shown as inclined. The connection of the fittings 24 and 25 with the stirrups 26 and 27 will tend to depress the link 28 and impart a tension to counterbalance the lever 29. As soon as this tension is sufficiently great the lever 29 will counterbalance and being a cocked lever, as described, will quickly turn to the inclined position. (Shown in Fig. 3.) It will be beyond the position of equilibrium before the link 43 begins to engage with the extension 34 and release the latch. Sufficient momentum will have been acquired by the lever and its weight to give a decided blow to the latch and elevate it against the tension of the spring 39, although the resistance to distension of this spring is greater than the tendency to counterbalance the lever 29. The movement of the lever 29 will occur instantly it is counterbalanced. There will be no tendency for the parts to momentarily stick, as in the structure described in my copending application. The lever being unrestrained, its movement will be almost instantaneous, and the latch will be tripped without any chance of delay. The tension of the spring 39 need not be accurately adjusted. It is sufficient that it hold the latch seated, and is not so great as to prevent the latch from being sprung at the proper time. The bolt 44 insures the seating of the latch; but it may be omitted, if desired.

Having now described my invention, what I claim as new, and desire to secure by Letters Patent, is—

1. In a weighing-machine, the combination with the hopper and pivoted receptacle, of a latch for preventing tilting of the receptacle, a lever responsive to vertical movement of the receptacle, means for opposing movement of the lever and for resisting the vertical movement of the receptacle, and a loss-motion connection between the lever and latch for actuating the latter after the receptacle is loaded.

2. In a weighing-machine, the combination with the hopper and pivoted receptacle, of a latch for preventing tilting of the receptacle, a lever, connections between the lever and receptacle to tend to counterbalance the former as the latter becomes filled, the said connections including a weight on the lever, and a loss-motion connection between the lever and latch for actuating the latter.

3. In a weighing-machine, the combination with the hopper and pivoted receptacle, of a latch for preventing tilting of the receptacle, a lever, connections between the lever and receptacle to tend to counterbalance the former as the latter becomes filled, the said connections including a weight on the lever, and a link connecting the lever and latch for actuating the latter.

4. In a weighing-machine, the combination with the hopper and pivoted receptacle, of a latch for preventing tilting of the receptacle, a spring for holding the latch seated, a lever responsive to vertical movement of the receptacle, a weight on the lever opposing such movement, and a link connecting the lever and latch.

5. In a weighing-machine, the combination with the hopper and pivoted receptacle, of a latch for preventing tilting of the receptacle, a lever, connections between the lever and receptacle for tilting the lever, the said lever being a cocked lever, and loss-motion connections between the lever and latch for tripping the latter.

6. In a weighing-machine, the combination with the receptacle which will empty by tilting, and means for supplying material to the receptacle, of a weighted lever, connections between the lever and receptacle for tilting the lever when the receptacle receives a predetermined quantity of material, the said lever being a cocked lever, and never in stable equilibrium, a latch for preventing tilting of the receptacle, and a loss-motion connection between the lever and latch for tripping the latter.

7. In a weighing-machine, the combination with the pivoted receptacle, and means for supplying material to it, of a latch for preventing tilting of the receptacle, a lever separate from the latch, connections between the receptacle and lever for tilting the lever when the receptacle receives a predetermined quantity of material, the said lever being a cocked lever, a spring for closing the latch and a loss-motion connection between the lever and latch for tripping the latter.

8. In a weighing-machine, the combination with the pivoted receptacle, and means for supplying material to it, of a latch for preventing tilting of the receptacle, a lever separate from the latch, connections between the receptacle and lever for tilting the lever when the receptacle receives a predetermined quantity of material, the said lever being a cocked lever, a spring for closing the latch, and a bolt carried by the lever and engaging with the latch for seating the latter.

9. In a weighing-machine, the combination with the receptacle and the hopper, gates for controlling the discharge from the hopper to the receptacle, levers moved by the descent of the receptacle and connections actuated by the descent of the receptacle for closing the gates, and a single spring opposing the descent of the receptacle.

10. In a weighing machine, the combination with the receptacle and the hopper, gates for controlling the discharge from the hopper to the receptacle, a shaft on each side of the gates, connections between the shafts and the receptacle for rotating the shafts as the receptacle descends, connections between each of the shafts and a gate, a lever on each shaft, and a single spring connecting the two levers, and opposing the descent of the receptacle and the closing of the gates.

11. In a weighing-machine, the combination with the oscillating receptacle, of means for suspending the receptacle, such means permitting the receptacle to descend as it becomes filled with material, a latch to prevent the receptacle from oscillating, and a lever connected to the latch for actuating it, the support for the lever being carried by the receptacle and descending with it.

This specification signed and witnessed this 21st day of August, 1905.

EWAN CAMERON.

Witnesses:
  JNO. ROBT. TAYLOR,
  JOHN L. LOTSCH.